United States Patent
Tsuchiya et al.

(10) Patent No.: US 11,329,587 B2
(45) Date of Patent: May 10, 2022

(54) MOTOR DRIVING APPARATUS, REFRIGERATION CYCLE SYSTEM, AIR CONDITIONER, WATER HEATER, AND REFRIGERATOR

(71) Applicant: Mitsubishi Electric Corporation, Tokyo (JP)

(72) Inventors: Atsushi Tsuchiya, Tokyo (JP); Kazunori Hatakeyama, Tokyo (JP); Shinya Toyodome, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/294,015

(22) PCT Filed: Dec. 19, 2018

(86) PCT No.: PCT/JP2018/046715
§ 371 (c)(1),
(2) Date: May 14, 2021

(87) PCT Pub. No.: WO2020/129170
PCT Pub. Date: Jun. 25, 2020

(65) Prior Publication Data
US 2022/0006410 A1     Jan. 6, 2022

(51) Int. Cl.
*H02P 25/18* (2006.01)
*F25B 31/02* (2006.01)
(Continued)

(52) U.S. Cl.
CPC ............ *H02P 25/18* (2013.01); *F25B 31/026* (2013.01); *H02M 7/53871* (2013.01); *H02P 27/08* (2013.01)

(58) Field of Classification Search
CPC ......... H02P 21/002016; H02P 21/0021; H02P 21/00852; H02P 21/142016; H02P 21/222016; H02P 21/362016; H02P 23/002016; H02P 23/00272; H02P 23/00862; H02P 25/022201;
(Continued)

(56) References Cited

U.S. PATENT DOCUMENTS 10,081,354 B2 *  9/2018  Sato ....................... B60L 58/21
2020/0162009 A1  5/2020  Hatakeyama

FOREIGN PATENT DOCUMENTS

JP   2013-062888 A   4/2013
JP   2018-014829 A   1/2018
(Continued)

OTHER PUBLICATIONS

International Search Report dated Mar. 5, 2019, in corresponding International Application PCT/JP2018/046715 (and English translation).

*Primary Examiner* — Antony M Paul
(74) *Attorney, Agent, or Firm* — Posz Law Group, PLC

(57) ABSTRACT

The motor driving apparatus includes a switch that is a mechanical switch for changing coil connection states of a motor; an inverter that generates alternating voltage from direct voltage and outputs the alternating voltage to the motor; and a control device that controls the switch and the inverter. The control device causes the switch to change the coil connection states while the alternating voltage output from the inverter is zero.

13 Claims, 12 Drawing Sheets

(51) Int. Cl.
*H02M 7/5387* (2007.01)
*H02P 27/08* (2006.01)

(58) Field of Classification Search
CPC ..... H02P 25/062201; H02P 25/083201; H02P 27/002013; H02P 27/042013; H02P 27/062013; H02P 27/082013; H02P 27/085201; H02P 1/002013; H02P 1/042013; H02P 1/163201; H02P 1/242013; H02P 1/262013; H02P 1/322013; H02P 1/422013; H02P 1/462013; H02P 1/465201
See application file for complete search history.

(56) References Cited

FOREIGN PATENT DOCUMENTS

| | | | | |
|---|---|---|---|---|
| JP | 2018-057114 A | | 4/2018 | |
| JP | 2018057114 A | * | 4/2018 | .............. H02P 25/18 |
| WO | 2018/163363 A1 | | 9/2018 | |

* cited by examiner

MOTOR DRIVING APPARATUS, REFRIGERATION CYCLE SYSTEM, AIR CONDITIONER, WATER HEATER, AND REFRIGERATOR

CROSS REFERENCE TO RELATED APPLICATION

This application is a U.S. national stage application of International Patent Application No. PCT/JP2018/046715 filed on Dec. 19, 2018, the disclosure of which is incorporated herein by reference.

TECHNICAL FIELD

The present invention relates to a motor driving apparatus, a refrigeration cycle system, an air conditioner, a water heater, and a refrigerator.

BACKGROUND

In a conventional technique, when coil connection states of a motor are changed, electromagnetic contactors are opened/closed while the current flowing from an inverter to the motor is controlled to zero, and the current to the relays of the electromagnetic contactors is zero.

For example, according to the technique in Patent Reference 1, the duty ratio of the inverter is adjusted on the basis of the motor current and the motor phase to cause the motor current to be zero, so that the coil connection states of the motor can be changed without passing the current through the electromagnetic contactors.

PATENT REFERENCE

Patent Reference 1: Japanese Patent Application Publication No. 2013-62888

However, the conventional technique requires changing of the coil connection states of the electromagnetic contactors while a potential difference is generated between contacts. If the coil connection states are changed while there is a potential difference between the contacts, arcs may be generated between the contacts of the relays and cause sticking that may result in a failure of the electromagnetic contactors.

SUMMARY

Accordingly, an object of at least one aspect of the present invention is to enable changing of the coil connection states of a motor while no potential difference is generated between contacts.

A motor driving apparatus according to at least one aspect of the present invention includes: a mechanical switch that changes coil connection states of a motor; an inverter that generates alternating voltage from direct voltage and outputs the alternating voltage to the motor; and a control device that control the mechanical switch and the inverter, wherein the control device causes the mechanical switch to change the coil connection states while the alternating voltage output from the inverter is zero.

According to one or more aspects of the present invention, the coil connection states of a motor can be changed while no potential difference is generated between contacts.

DETAILED DESCRIPTION

Figure 1:
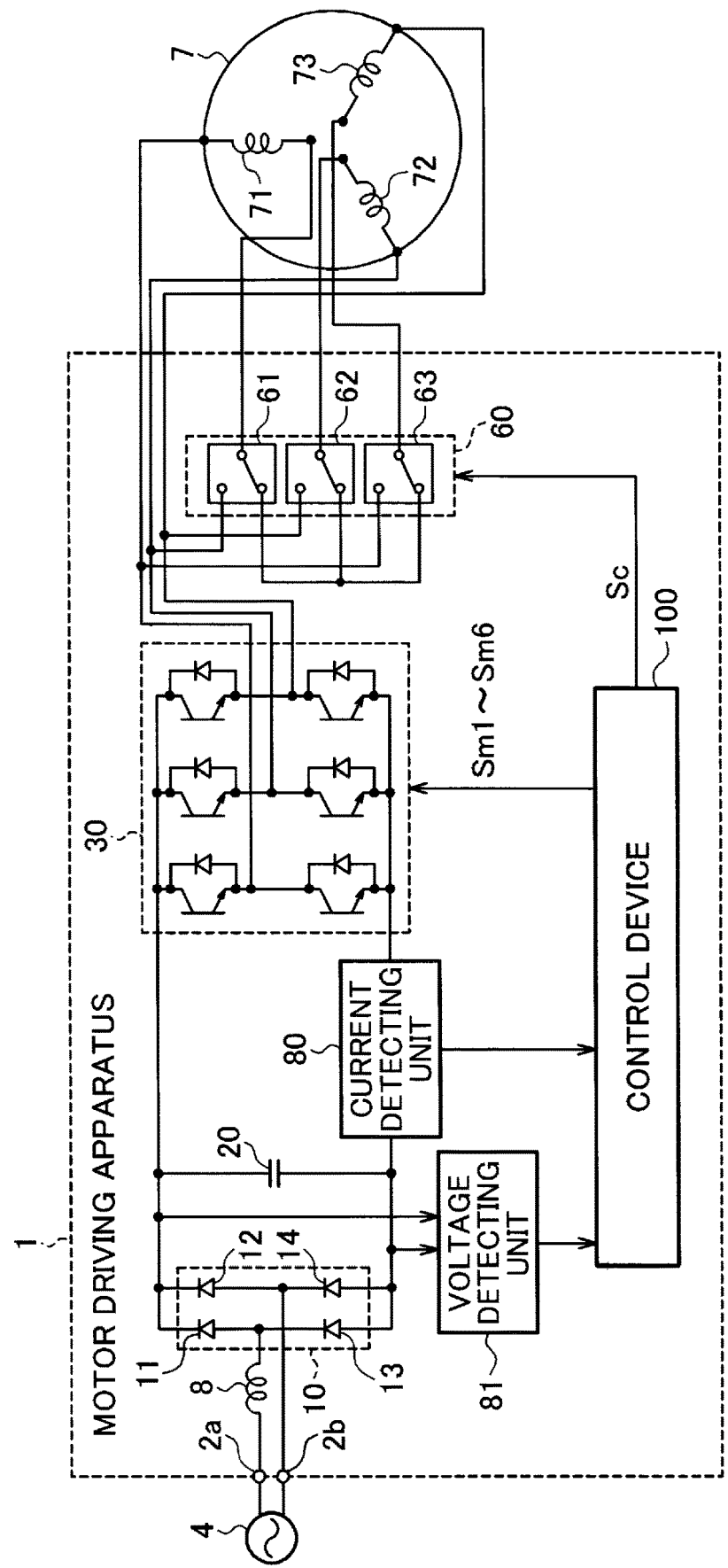
FIG. 1 is a schematic wiring diagram illustrating a motor driving apparatus according to a first embodiment, together with an alternating power source and a motor.

Now will be described, with reference to the drawings, a motor driving apparatus according to an embodiment; a refrigeration cycle system including the motor driving apparatus, the refrigeration cycle system being equipment to which the refrigeration cycle is applied; and an air conditioner, a water heater, and a refrigerator including the refrigeration cycle system. It should be noted that the following embodiments are mere examples, and various modifications can be made to the motor driving apparatus and each system including the motor driving apparatus. Note that in the following description, the components denoted by the same reference numerals have the same or similar functions.

FIG. 1 is a schematic wiring diagram illustrating a motor driving apparatus 1 according to a first embodiment, together with an alternating power source 4 and a motor 7.

The alternating power source 4 supplies alternating power to the motor driving apparatus 1.

The motor driving apparatus 1 receives alternating power from the alternating power source 4 and drives the motor 7.

The motor 7 includes windings 71, 72, and 73 of three phases consisting of a U-phase, a V-phase, and a W-phase. For example, the motor 7 is a three-phase permanent-magnet synchronous motor, and the ends of stator windings (hereinafter also referred to as "windings") are led out to the outside of the motor 7 so that the motor 7 can be changed between a star connection (Y-connection) and the delta connection (Δ-connection). Such switching is performed by a connection changeover device 60. Note that in the case where the Y-connection is referred to as "first connection," the Δ-connection is referred to as "second connection"; and in the case where the Δ-connection is referred to as "first connection," the Y-connection is referred to as "second connection." The coil connection states of the windings may include three or more types.

As illustrated in FIG. 1, the motor driving apparatus 1 includes an inverter 30, a connection changeover device 60, and a control device 100. The motor driving apparatus 1 may further include alternating-power input terminals 2a and 2b, a reactor 8, a rectifier circuit 10, a capacitor 20, a current detecting unit 80, and a voltage detecting unit 81.

The alternating-power input terminals 2a and 2b are connected to the external alternating power source 4 and receive alternating power input from the alternating power source 4. Alternating voltage is applied to the alternating-power input terminals 2a and 2b from the alternating power source 4.

The rectifier circuit 10 receives the alternating voltage from the alternating power source 4 via the alternating-power input terminals 2a and 2b and the reactor 8, and rectifies the alternating voltage to generate direct voltage. The rectifier circuit 10 is a full-wave rectifier circuit formed by bridging rectifier elements 11 to 14, such as diodes.

The capacitor 20 smoothens and outputs the direct voltage generated by the rectifier circuit 10.

The inverter 30 performs switching in accordance with pulse width modulation (PWM) signals Sm1 to Sm6 from the control device 100 to convert the direct voltage into three-phase alternating voltage. The inverter 30 outputs the three-phase alternating voltage to the motor 7 to drive the motor 7. The inverter 30 applies alternating voltage to the windings 71 to 73 via switches 61 to 63, and receives counter-electromotive voltage from the windings 71 to 73 of the motor 7 during rotation via the switches 61 to 63.

The connection changeover device 60 includes the switches 61 to 63. By turning on/off the switches 61 to 63 during rotation of the motor 7, the connection changeover device 60 changes the coil connection states of the windings 71 to 73 of the motor 7. Here, it is assumed that the coil connection states can be changed between Y-connection and Δ-connection. The switches 61 to 63 are mechanical switches, such as electromagnetic contactors.

The current detecting unit 80 detects a bus current, i.e., the direct current input to the inverter 30. The current detecting unit 80 includes a shunt resistor placed in a direct bus and supplies a current detection signal that is an analog signal indicating the detection result, to the control device 100. The current detection signal is converted into a digital signal by an analog-to-digital (A/D) converter (not illustrated) of the control device 100, and is used for internal processing of the control device 100.

In the example described above, the bus current is detected by the current detecting unit 80; however, the embodiments are not limited to such an example. For example, the current detecting unit 80 may detect the current of each phase output from the inverter 30. In such the case, the current detecting unit 80 may detect the current of each phase, for example, by being provided with a shunt resistor placed between the switching elements of the lower arms of the inverter 30 and the GND.

The voltage detecting unit 81 detects the bus voltage applied to the inverter 30. The voltage detecting unit 81 includes, for example, a resistive voltage divider, and supplies a voltage detection signal that is an analog signal indicating a detection result, to the control device 100. The current detection signal is converted into a digital signal by the A/D converter (not illustrated) of the control device 100, and is used for internal processing of the control device 100.

The control device 100 controls the connection changeover device 60 and the inverter 30. For example, the control device 100 controls the rotation of the motor 7 by controlling the inverter 30. The control device 100 causes the connection changeover device 60 to switch the connection states of the windings. For the control of the inverter 30, the control device 100 generates PWM signals Sm1 to Sm6 and supplies these to the inverter 30.

Specifically, the control device 100 causes the connection changeover device 60 to change the coil connection states while the alternating voltage output from the inverter 30 is zero. For example, the control device 100 causes the alternating voltage output from the inverter 30 to be zero by turning off the switching elements of the upper arms of the inverter 30. It is desirable that the control device 100 increase the rotational speed of the motor 7 to an overmodulation region and subsequently cause the alternating voltage output from the inverter 30 to be zero.

More specifically, the control device 100 performs changeover preparation operation in which the switching elements of the lower arms of the inverter 30 are alternately turned on and off while the switching elements of the upper arms of the inverter 30 are turned off; subsequently, the control device 100 turns on the switching elements of the lower arms and causes the connection changeover device 60 to change the coil connection states. In the changeover preparation operation, it is desirable that the control device 100 cause the periods during which the switching elements of the lower arms are turned on to become longer over time.

Figure 2A:
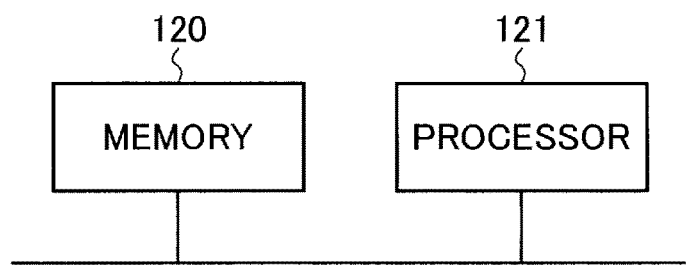
FIGS. 2A and 2B are block diagrams schematically illustrating hardware configuration examples.
Figure 2B:
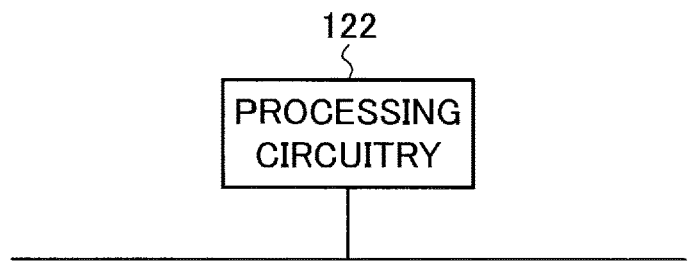

The control device 100 can be implemented by, for example, a microcomputer including a memory 120 and a processor 121, as illustrated in FIG. 2A, where the memory 120 serves as a storage device for storing control information in the form of a software program, and the processor 121 is a central processing unit (CPU) or the like for executing the program. The control device 100 may alternatively be implemented by processing circuitry 122, such as a digital signal processor (DSP), as illustrated in FIG. 2B. A case in which the control device 100 is implemented by a microcomputer will now be described.

Figure 3:
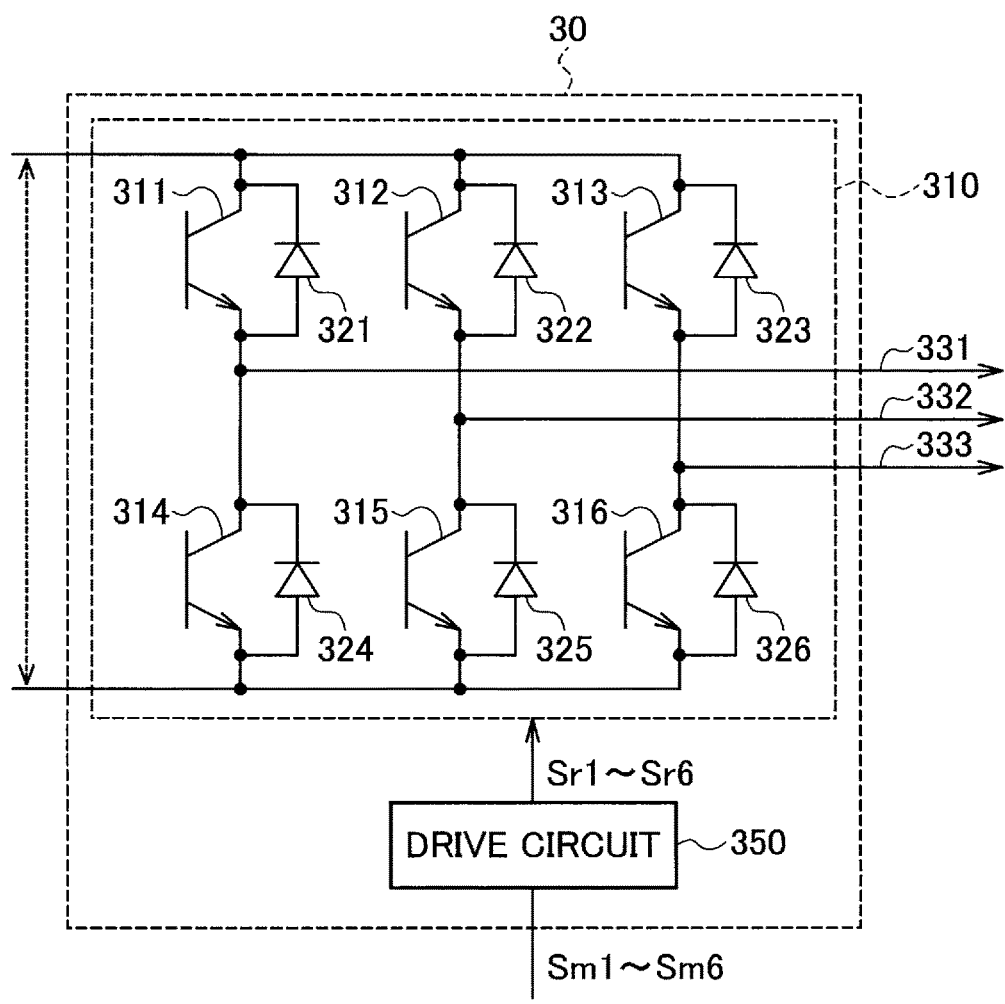
FIG. 3 is a schematic diagram illustrating the configuration of an inverter.

FIG. 3 is a schematic diagram illustrating the configuration of the inverter 30.

The inverter 30 includes an inverter main circuit 310 and a drive circuit 350.

An input terminal of the inverter main circuit 310 is connected to an electrode of the capacitor 20. The line connecting the output of the rectifier circuit 10, the electrode of the capacitor 20, and the input terminal of the inverter main circuit 310 is referred to as a direct bus line.

The inverter 30 is controlled by the control device 100 to turn on and off the switching elements 311 to 316 of the six arms of the inverter main circuit 310. Through such on-off operation, the inverter 30 generates frequency-variable, voltage-variable three-phase alternating voltage, and supplies the three-phase alternating voltage to the motor 7. The switching elements 311 to 316 are connected in parallel with respective rectifier elements 321 to 326 for freewheeling.

The switching elements 311, 312, and 313 positioned on the high potential side are switching elements of the upper arms. Specifically, the switching element 311 corresponds to the U-phase upper arm, the switching element 312 corresponds to the V-phase upper arm, and the switching element 313 corresponds to the W-phase upper arm.

The switching elements 314, 315, and 316 positioned on the low potential side are switching elements of the lower arms. Specifically, the switching element 314 corresponds to the U-phase lower arm, the switching element 315 corresponds to the V-phase lower arm, and the switching element 316 corresponds to the W-phase lower arm.

As illustrated in FIG. 3, the inverter 30 includes a drive circuit 350, in addition to the inverter main circuit 310.

The drive circuit 350 generates drive signals Sr1 to Sr6 on the basis of the PWM signals Sm1 to Sm6. The drive circuit 350 controls the on-off operations of the switching elements 311 to 316 by the drive signals Sr1 to Sr6, to apply frequency-variable, voltage-variable three-phase alternating voltage to the motor 7.

The PWM signals Sm1 to Sm6 are signals having signal levels of a logic circuit, e.g., from 0 to 5 V, whereas the drive signals Sr1 to Sr6 are signals having voltage levels required for the control of the switching elements 311 to 316, e.g., from +15 to −15 V. The reference potential of the PWM signals Sm1 to Sm6 is the ground potential of the control device 100, whereas the reference potential of the drive signals Sr1 to Sr6 is the potential of the negative terminals of the corresponding switching elements.

Figure 4:
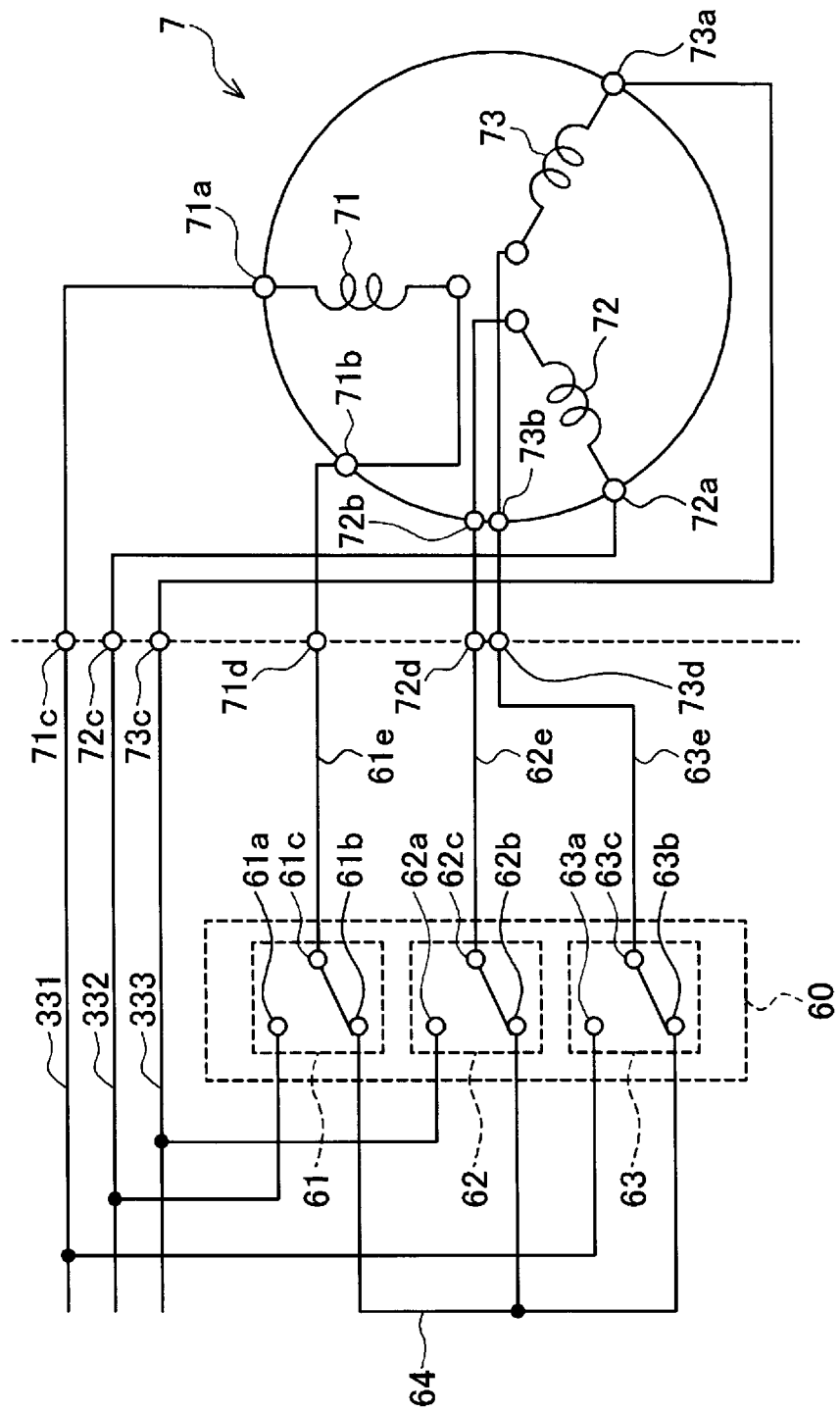
FIG. 4 is a wiring diagram illustrating in more detail a motor and a connection changeover device.

FIG. 4 is a wiring diagram illustrating in more detail the motor 7 and the connection changeover device 60.

First ends 71a, 72a, and 73a of the windings 71, 72, and 73 of the three-phases or U-, V-, and W-phases of the motor 7 are connected to external terminals 71c, 72c, and 73c, respectively. Second ends 71b, 72b, and 73b of the windings 71, 72, and 73 of the U-, V-, and W-phases of the motor 7 are connected to external terminals 71d, 72d, and 73d, respectively. In this way, the motor 7 can be connected to the connection changeover device 60. Output lines 331, 332, and 333 of the U-, V-, and W-phases of the inverter 30 are connected to the external terminals 71c, 72c, and 73c, respectively.

In the illustrated example, the connection changeover device 60 includes switches 61 to 63 serving as mechanical switches. As the switches 61, 62, and 63, electromagnetic contactors having contacts that are electromagnetically opened and closed are used. Such electromagnetic contactors include ones that are referred to as relays, contactors, or the like.

Figure 5:
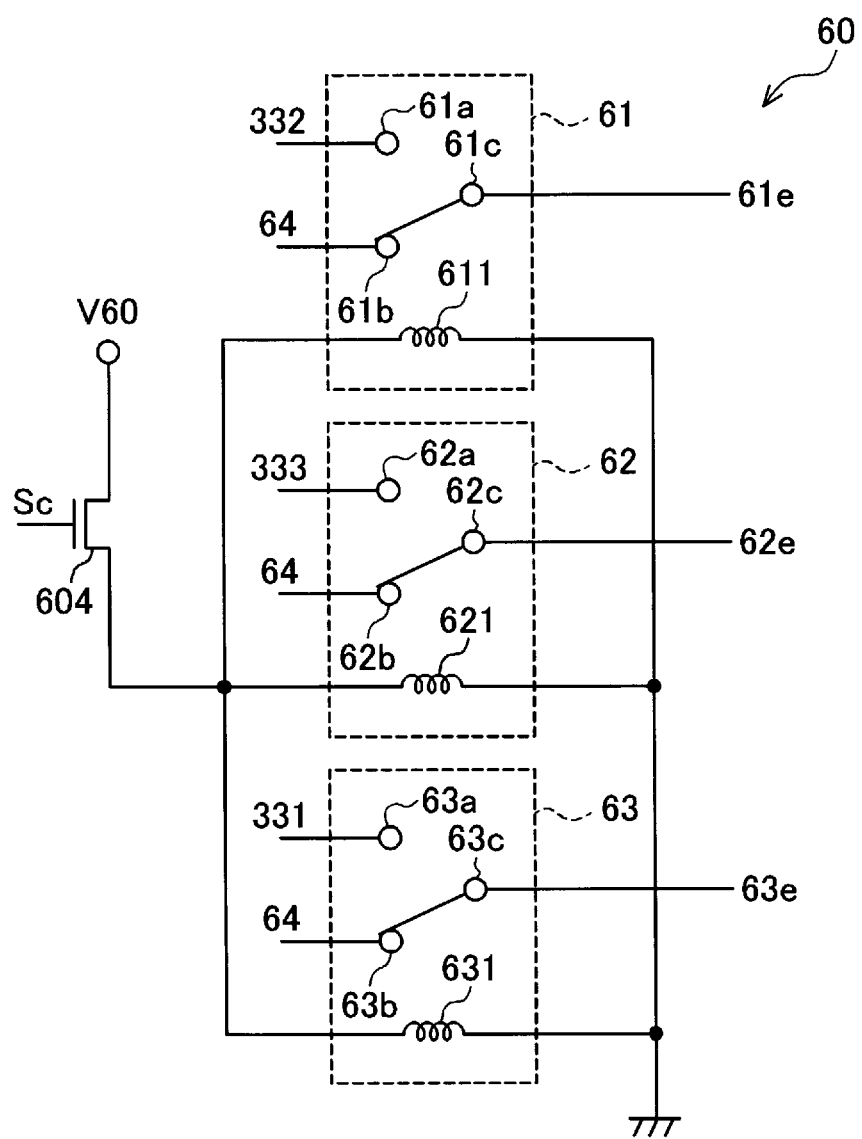
FIG. 5 is a wiring diagram illustrating a configuration example of switches.

FIG. 5 is a wiring diagram illustrating a configuration example of the switches 61 to 63.

The switches 61 to 63 establish different coil connection states, for example, when current is flowing through excitation coils 611, 621, and 631 and when no current is flowing through excitation coils 611, 621, and 631. The excitation coils 611, 621, and 631 are connected so as to receive changeover power voltage V60 via a semiconductor switch 604. Although not illustrated, the changeover power voltage V60 may be, for example, supplied from the rectifier circuit 10.

The opening and closing of the semiconductor switch 604 are controlled by a changeover control signal Sc output from the control device 100. When sufficient current is supplied from the microcomputer included in the control device 100, the current may be directly fed from the microcomputer to the excitation coils.

A common contact 61c of the switch 61 is connected to the external terminal 71d via a lead wire 61e. A normally closed contact 61b is connected to a neutral node 64, and a normally open contact 61a is connected to the V-phase output line 332 of the inverter 30.

A common contact 62c of the switch 62 is connected to the external terminal 72d via a lead wire 62e. A normally closed contact 62b is connected to the neutral node 64, and a normally open contact 62a is connected to the W-phase output line 333 of the inverter 30.

A common contact 63c of the switch 63 is connected to the external terminal 73d via a lead wire 63e. A normally closed contact 63b is connected to the neutral node 64, and a normally open contact 63a is connected to the U-phase output line 331 of the inverter 30.

Figure 7:
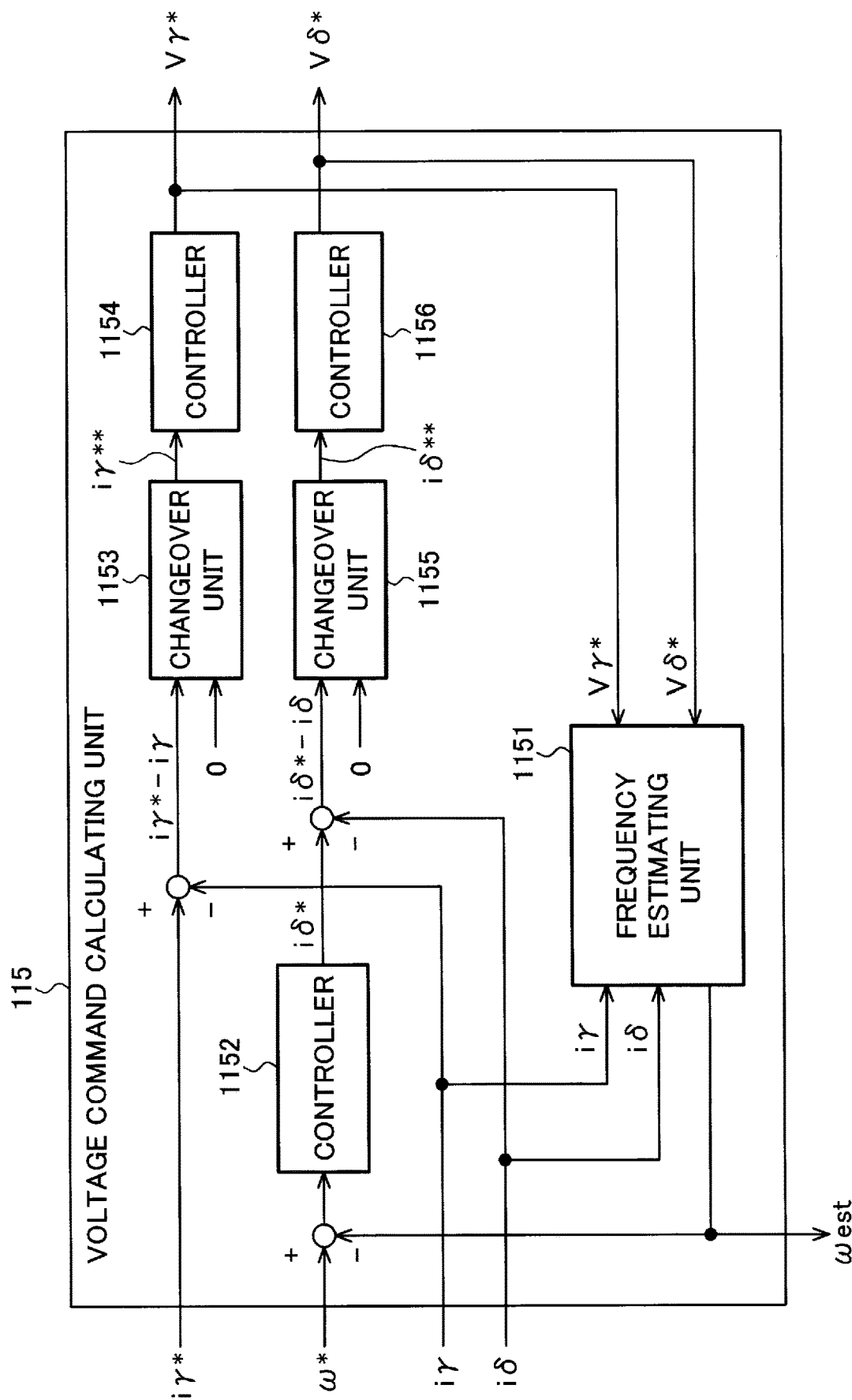
FIG. 7 is a block diagram schematically illustrating an example of the functional configuration of a voltage command calculating unit.

When no current flows through the excitation coils 611, 621, and 631, the switches 61, 62, and 63 are switched to the normally closed contact side, that is, the common contacts 61c, 62c, and 63c are respectively connected to the normally closed contacts 61b, 62b, and 63b, as illustrated in FIG. 7. This state corresponds to a Y-connection state of the motor 7.

When current flows through the excitation coils 611, 621, and 631, the switches 61, 62, and 63 are switched to the normally open contact side, that is, the common contacts 61c, 62c, and 63c are respectively connected to the normally open contacts 61a, 62a, and 63a, unlike that illustrated. This state corresponds to a Δ-connection state of the motor 7.

Figure 6:
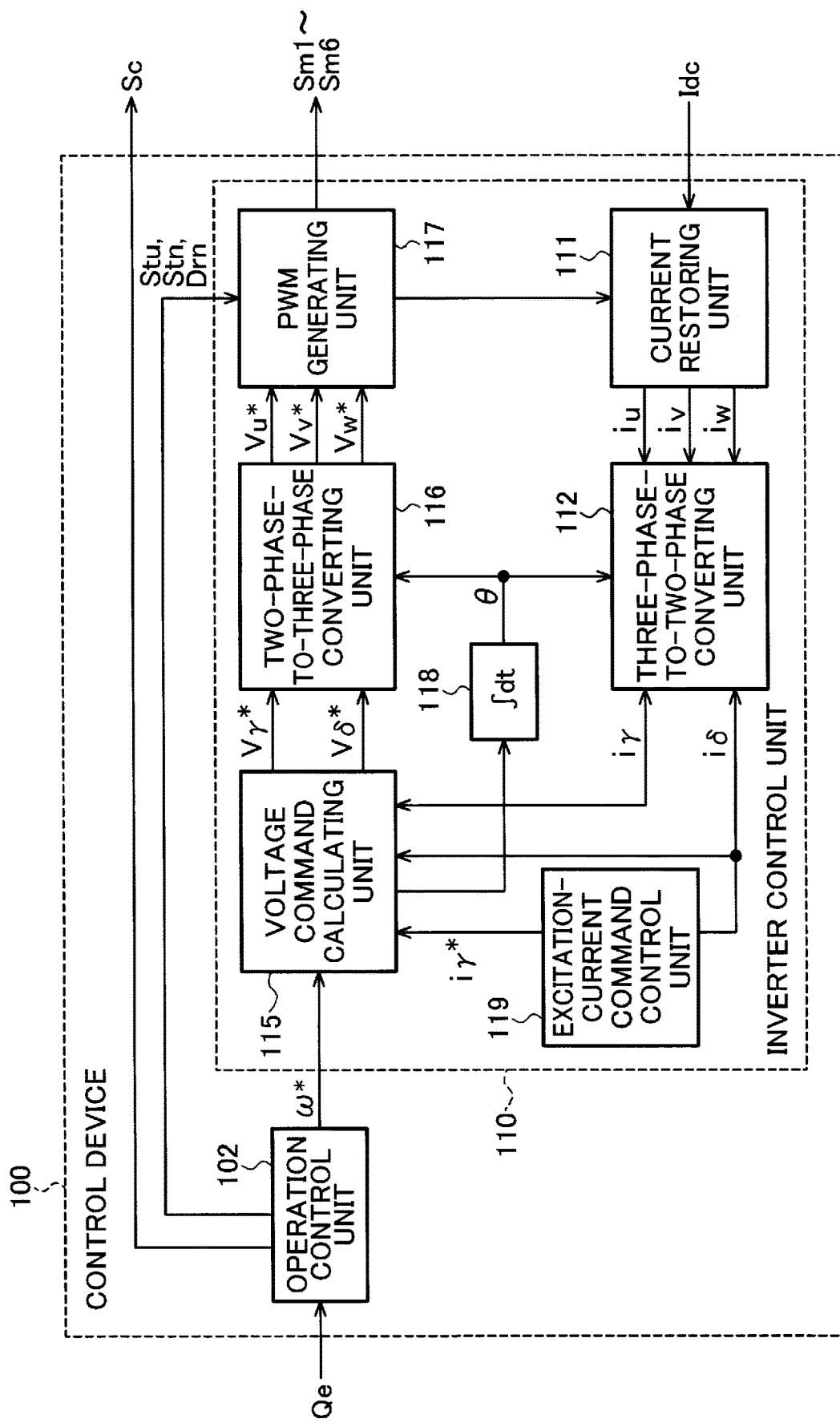
FIG. 6 is a block diagram schematically illustrating an example of the functional configuration of a control device.

FIG. 6 is a block diagram schematically illustrating an example of the functional configuration of the control device 100.

The control device 100 includes an operation control unit 102 and an inverter control unit 110.

The operation control unit 102 receives a voltage detection signal Qe provided by the voltage detecting unit 81, a command signal based on the electrical quantity of an electrical signal indicating the room temperature detected by a temperature sensor (not illustrated), and a command signal indicating instruction information from an operation unit (not illustrated), such as a remote controller, and controls the operation of each unit of the air conditioner. Instructions from the operation units include information indicating a set temperature, selection of an operation mode, instructions for operation start and stop, etc.

The operation control unit 102 determines, for example, whether the stator windings of the motor 7 are to be Y-connected or Δ-connected and determines a target rotational speed, and outputs a changeover control signal Sc and a frequency command value ω* based on the determination.

Specifically, when the operation control unit 102 is to change the coil connection states of the motor 7, the operation control unit 102 outputs a frequency command value ω* to control the inverter 30 such that the rotational speed of the motor 7 is increased to a predetermined changeover rotational speed or higher. Here, it is assumed that the changeover rotational speed is the minimum rotational speed of the overmodulation region. In this way, the resistance component of the regenerative braking of the motor 7 is decreased, and thereby a sudden decrease in the rotational speed of the motor 7 can be prevented when the coil connection state of the motor 7 is changed.

When the rotational speed of the motor 7 reaches or exceeds the changeover rotational speed, the operation control unit 102 feeds an upper-arm stop signal Stu to a PWM generating unit 117 so that all of the switching elements 311, 312, and 313 of the upper arms are turned off to cause the output from the inverter 30 to be zero. By operating the connection changeover device 60 while the output voltage of the inverter 30 is zero and the potential difference generated between the contacts of the connection changeover device 60 is suppressed, the arc discharge generated in the connection changeover device 60 can be suppressed. In this way, sticking in the connection changeover device 60 can be suppressed, and the reliability of the connection changeover device 60 can be enhanced.

The operation control unit 102 subsequently performs changeover preparation operation of the coil connection states of the motor 7. Specifically, the operation control unit 102 alternately feeds a lower-arm stop signal Stn and a lower-arm drive signal Drn to the PWM generating unit 117 so that all of the switching elements 314, 315, and 316 of the lower arms of the inverter 30 are repeatedly turned on and off. This can suppress the inrush current that occurs when all of the switching elements 314, 315, and 316 of the lower arms of the inverter 30 are turned on.

After the completion of the changeover preparation operation, the operation control unit 102 feeds the lower-arm drive signal Drn to the PWM generating unit 117 so that all of the switching elements 314, 315, and 316 of the lower arms of the inverter 30 are turned on and feeds the changeover control signal Sc to the connection changeover device 60. In this way, the electric power generated by the rotation of the motor 7 can be dissipated.

As illustrated in FIG. 6, the inverter control unit 110 includes a current restoring unit 111, a three-phase-to-two-phase converting unit 112, a voltage command calculating unit 115, a two-phase-to-three-phase converting unit 116, a PWM generating unit 117, an electrical-angle phase calculating unit 118, and an excitation-current command control unit 119.

The current restoring unit 111 restores the current values iu, iv, and iw of the phase current flowing through the motor 7 on the basis of the value of the direct current Idc detected by the current detecting unit 80 illustrated in FIG. 1. The current restoring unit 111 restores the current values iu, iv, and iw of the phase current by sampling the direct current Idc detected by the current detecting unit 80 at a timing determined on the basis of the PWM signal provided by the PWM generating unit 117.

The three-phase-to-two-phase converting unit 112 converts the current values iu, iv, and iw restored by the current restoring unit 111 into current values on the γ-δ axis each represented by an excitation current component (hereinafter also referred to as "γ-axis current") iγ and a torque current component (hereinafter also referred to as "δ-axis current") iδ by using the electrical angle phase θ generated by the electrical-angle phase calculating unit 118 described below.

The excitation-current command control unit 119 determines an optimum excitation current command value iγ* that achieves maximum efficiency for driving the motor 7 on the basis of the torque current component iδ. Note that, in FIG. 6, the excitation current command value iγ* is determined on the basis of the torque current component iδ; alternatively, the excitation current command value iγ* may be determined on the basis of the excitation current component iγ and the frequency command value ω* to achieve the same effect.

The excitation-current command control unit 119 outputs an excitation current command value iγ* that derives a current phase angle that causes the output torque to be higher than or equal to a predetermined value, i.e., causes the current value to be smaller than or equal to a predetermined value, on the basis of the torque current component iδ.

The voltage command calculating unit 115 estimates frequency corresponding to the rotational speed of the motor 7 from the excitation current component iγ and the torque current component iδ fed from the three-phase-to-two-phase converting unit 112, and generates and outputs a δ-axis voltage command value Vδ* and a γ-axis voltage command value Vγ* that cause the estimated frequency to coincide with the frequency command value ω* from the operation control unit 102.

FIG. 7 is a block diagram schematically illustrating an example of the functional configuration of the voltage command calculating unit 115.

The voltage command calculating unit 115 operates to output the voltage command values Vγ* and Vδ* on the basis of the γ-axis current iγ and δ-axis current iδ obtained from the three-phase-to-two-phase converting unit 112, the frequency command value ω*, and the excitation current command value iγ* obtained from the excitation-current command control unit 119.

A controller 1152 is, for example, a proportional integral (PI) controller, and outputs a δ-axis current command value iδ* that causes a frequency estimated value ωest to coincide with a frequency command value ω*, on the basis of the difference (ω*-ωest) between the frequency command value ω* and the frequency estimated value ωest generated by a frequency estimating unit 1151.

The frequency estimating unit 1151 estimates the frequency of the motor 7 on the basis of the γ-axis current iγ, the δ-axis current iδ, and the voltage command values Vγ* and Vδ* to generate the frequency estimation value ωest.

A changeover unit 1155 selects the δ-axis current command value iδ** to be either the difference (iδ*-iδ) between the δ-axis current command value iδ* and the δ-axis current iδ or zero; and a controller 1156, such as a PI controller, outputs a δ-axis voltage command value Vδ* that causes the δ-axis current iδ to coincide with the δ-axis current command value iδ*.

A changeover unit 1153 selects the γ-axis current command value iδ** to be either the difference (iγ*-iγ) between the γ-axis current command value iγ* and the γ-axis current iγ and zero; and for example, a controller 1154, such as a PI controller, outputs a γ-axis voltage command value Vγ* that causes that the γ-axis current iγ to coincide with the γ-axis current command value iγ*.

The two-phase-to-three-phase converting unit 116 illustrated in FIG. 6 converts the γ-axis voltage command value Vγ* and the δ-axis voltage command value Vδ*, which are the voltage command values in a two-phase coordinate system obtained by the voltage command calculating unit 115, into output voltage command values Vu*, Vv*, and Vw* in a three-phase coordinate system by using the electrical angle phase θ obtained by the electrical-angle phase calculating unit 118, and outputs the output voltage command values Vu*, Vv*, and Vw*.

The PWM generating unit 117 generates PWM signals Sm1 to Sm6 on the basis of the three-phase voltage command values Vu*, Vv*, and Vw* obtained from the two-phase-to-three-phase converting unit 116 and outputs the PWM signals Sm1 to Sm6.

The upper-arm stop signal Stu, the lower-arm stop signal Stn, and the lower-arm drive signal Drn provided by the operation control unit 102 are fed to the PWM generating unit 117.

When the PWM generating unit 117 receives the upper-arm stop signal Stu, the PWM generating unit 117 immediately stops the output of the PWM signals Sm1, Sm2, and Sm3 to the respective switching elements 311, 312, and 313 of the upper arms.

When the PWM generating unit 117 receives the lower-arm stop signal Stn, the PWM generating unit 117 immediately stops the output of the PWM signals Sm4, Sm5, and Sm6 to the switching elements 314, 315, and 316 of the lower arms.

When the PWM generating unit 117 receives the lower-arm drive signal Drn, the PWM generating unit 117 outputs the PWM signals Sm4, Sm5, and Sm6 so that all of the switching elements 314, 315, and 316 of the lower arms are turned on.

The drive circuit 350 illustrated in FIG. 3 generates drive signals Sr1 to Sr6 on the basis of the PWM signals Sm1 to Sm6.

The example of FIG. 6 illustrates a configuration for restoring the current values iu, iv, and iw of the phase current from the direct current Idc input to the inverter 30; alternatively, the configuration may include current detecting units provided on the output lines 331, 332, and 333 of the inverter 30, and the phase current may be detected by the current detecting units. In such the case, the current detected by the current detecting unit may be used in place of the current restored by the current restoring unit 111.

When a three-phase permanent-magnet synchronous motor is used as the motor 7, irreversible demagnetization of the permanent magnet occurs and the magnetic force decreases as a result of an excessive current flow in the motor 7. When such a situation occurs, the current required for outputting the same torque increases, which causes the problem of loss deterioration. Therefore, by inputting the current values iu, iv, and iw of the phase current or the value of the direct current Idc to the control device 100, when excessive current flows through the motor 7, the PWM signals Sm1 to Sm6 can be stopped to stop the current flow to the motor 7, and thereby irreversible demagnetization can be prevented. Note that the current values iu, iv, and iw of the phase current or the direct current Idc may be passed through a low-pass filter (LPF) for removing noise to prevent the PWM signals Sm1 to Sm6 from being erroneously stopped due to noise; in this way, it is possible to further enhance the reliability.

In the case where the motor 7 can be switched between Y-connection and Δ-connection, the current values (IY and IΔ) at which irreversible demagnetization occur in the Y-connection and the Δ-connection are approximately √3 times different, where the current value in the Δ-connection is √3 times larger than that in the Y-connection. Therefore, if the protection level for irreversible demagnetization is set in accordance with the Y-connection, the protection for IΔ is applied early, and thus it becomes difficult to expand the operating range. Therefore, by changing the protection level in accordance with the Y-connection or the Δ-connection in the control device 100, it is possible to reliably protect the motor 7 from irreversible demagnetization in each winding, and a motor driving apparatus having enhanced reliability can be obtained The protection level may be set to a current value that does not affect the performance when irreversible demagnetization occurs, that is, for example, the current value at which the magnetic force falls to 97%, where the magnetic force in the initial state of the motor 7 is set to 100%; however, there is no problem in changing the current value set for the protection level in accordance with the equipment to be used.

Figure 8:
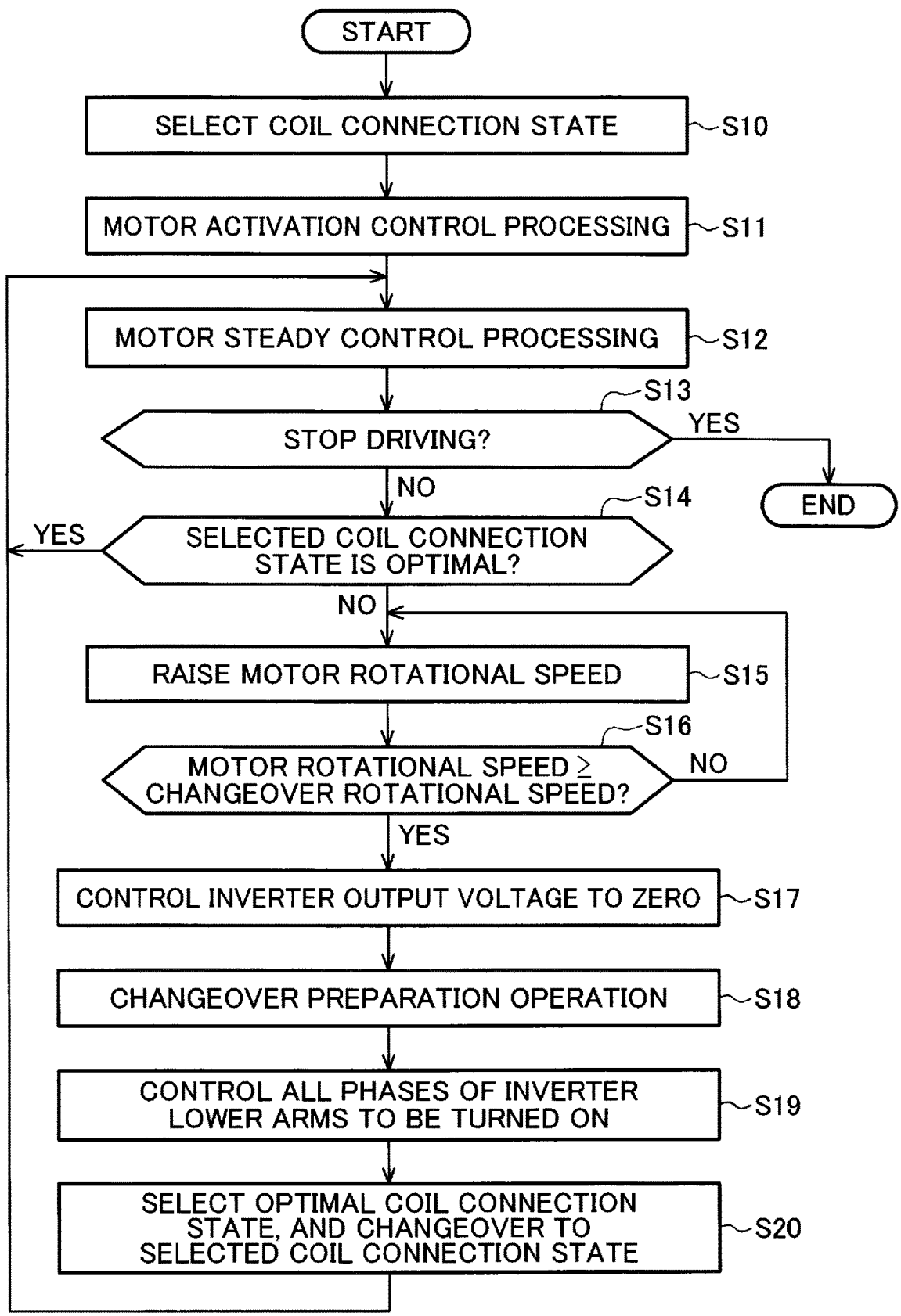
FIG. 8 is a flowchart illustrating changeover operation of coil connection states.

FIG. 8 is a flowchart illustrating changeover operation of coil connection states.

The flowchart of FIG. 8 starts when the motor 7 is activated.

The operation control unit 102 selects one coil connection state as the coil connection state of the motor 7 (step S10). The operation control unit 102 feeds a changeover control signal Sc to the connection changeover device 60 to establish the selected coil connection state. The connection changeover device 60 receives the changeover control signal Sc and turns on/off the switches 61 to 63 to establish the selected coil connection state.

The operation control unit 102 then performs activation control processing of the motor 7 (step S11). The rotational speed of the motor 7 is raised to a predetermined rotational speed.

The operation control unit 102 then performs steady control processing for controlling the rotational speed of the motor 7 on the basis of the electrical quantity of the electrical signal indicating the room temperature detected by a temperature sensor (not illustrated) or instruction information from an operation unit (not illustrated) (step S12).

The operation control unit 102 then determines whether or not to stop driving (step S13). For example, if the operation control unit 102 receives an instruction to stop the operation from an operation unit (not illustrated), the operation control unit 102 determines to stop driving. If the driving is to be stopped (Yes in step S13), the operation control unit 102 stops the driving of the motor 7, and the process ends. If the driving is not to be stopped (No in step S13), the process proceeds to step S14.

In step S14, the operation control unit 102 determines whether or not the currently selected coil connection state is the optimum coil connection state. If the coil connection state is optimum (Yes in step S14), the process returns to step S12; and if the coil connection state is not optimum (No in step S14), the process proceeds to step S15.

In step S15, the operation control unit 102 outputs the frequency command value ω* to raise the rotational speed of the motor 7.

The operation control unit 102 then determines whether or not the rotational speed of the motor 7 is higher than or equal to the changeover rotational speed (step S16). If the rotational speed is below the changeover rotational speed (No in step S16), the process returns to step S15; and if the rotational speed is higher than or equal to the changeover rotational speed (Yes in step S16), the process proceeds to step S17.

In step S17, the operation control unit 102 performs control so that the voltage output from the inverter 30 is zero. Specifically, the operation control unit 102 feeds the upper-arm stop signal Stu to the PWM generating unit 117 so that all of the switching elements 311, 312, and 313 of the upper arms are turned off.

The operation control unit 102 then performs changeover preparation operation of the coil connection states of the motor 7 (step S18). Specifically, the operation control unit 102 alternately feeds the lower-arm stop signal Stn and the lower-arm drive signal Drn to the PWM generating unit 117 so that all of the switching elements 314, 315, and 316 of the lower arms of the inverter 30 are repeatedly turned on and off.

The operation control unit 102 then feeds the lower-arm drive signal Drn to the PWM generating unit 117 so that all of the switching elements 314, 315, and 316 of the lower arms of the inverter 30 are turned on.

The operation control unit 102 then selects the optimum coil connection state and feeds the changeover control signal Sc to the connection changeover device 60 so that the selected coil connection state is established (step S20). The process then returns to step S12.

Figure 9:
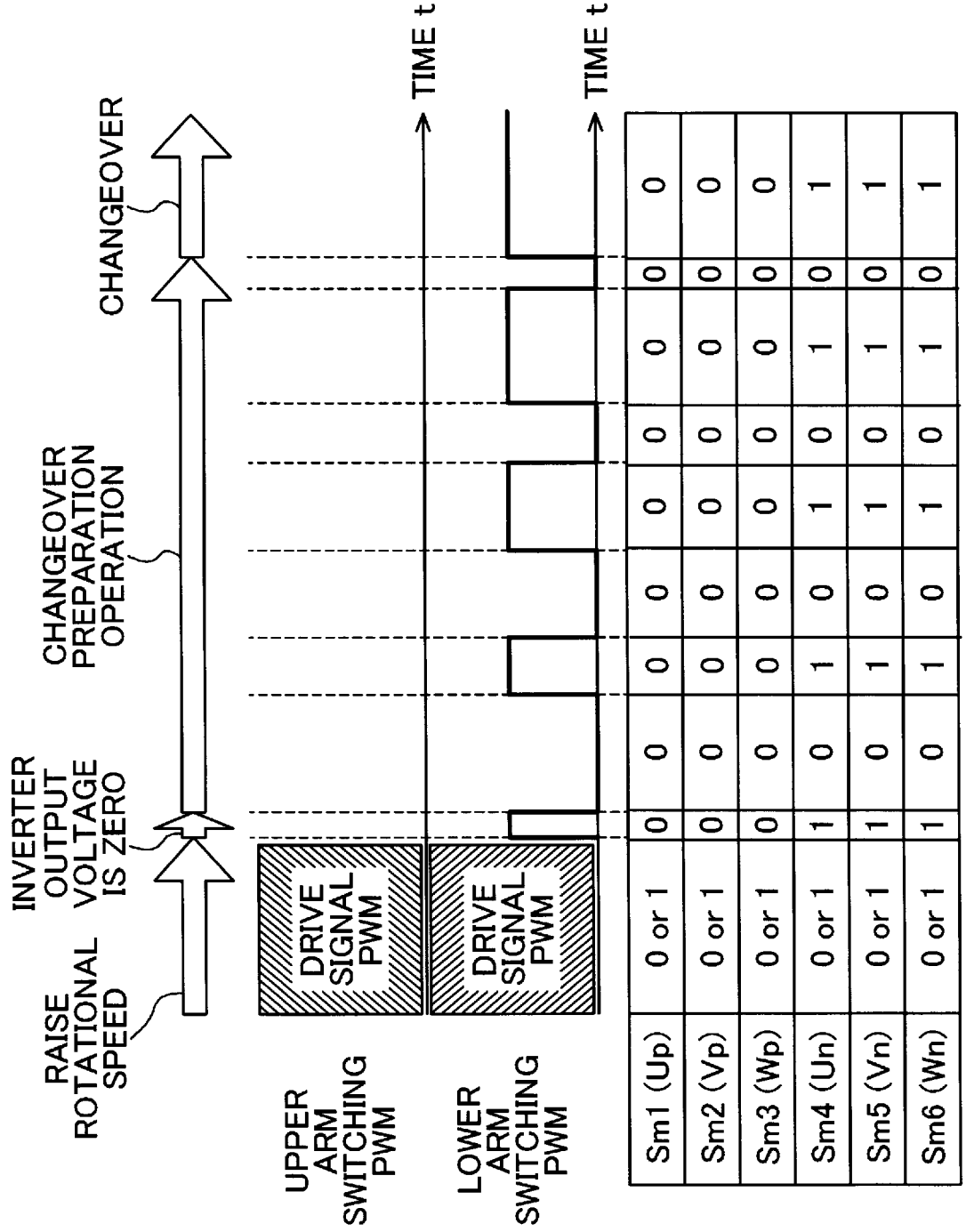
FIG. 9 is a schematic diagram for explaining PWM signals for changing the coil connection states of the motor.

FIG. 9 is a schematic diagram illustrating the PWM signal Sm1 to Sm6 for changing the coil connection states of the motor 7.

As illustrated in FIG. 9, when the coil connection states of the motor 7 are changed, the control device 100 raises the rotational speed of the motor 7 to a rotational speed in the overmodulation region higher than the rotational speed during steady operation. Here, the motor 7 receives PWM signals Sm1 to Sm6 that correspond to the rotational speed of the driven motor 7.

When the connection of the windings of the motor 7 is to be changed, the output of the PWM signals Sm1, Sm2, and Sm3 to the respective switching elements 311, 312, and 313 of the upper arms are stopped to cause the output voltage of the inverter 30 to be zero. In this example, the output of the PWM signals Sm4, Sm5, and Sm6 to the respective switching elements 314, 315, and 316 of the lower arms is "1," which indicates ON.

In the changeover preparation operation, the control device 100 alternately outputs "1," which indicates ON, and "0," which indicates OFF, as output of the PWM signals Sm4, Sm5, and Sm6 to the respective switching elements 314, 315, and 316 of the lower arms while the output of the PWM signals Sm1, Sm2, and Sm3 to the respective switching elements 311, 312, and 313 of the upper arms is stopped. Here, the control device 100 causes the ON periods of the PWM signals Sm4, Sm5, and Sm6 to become longer over time.

The control device 100 changes the coil connection states in changeover periods during which "1," which indicates ON, is output as the PWM signals Sm4, Sm5, and Sm6 to the respective switching elements 314, 315, and 316 of the upper arms while the output of the PWM signals Sm1, Sm2, and Sm3 to the respective switching elements 311, 312, and 313 of the lower arms is stopped.

The reason for raising the rotational speed of the motor 7 when the coil connection states of the motor 7 are to be changed will now be described.

In this embodiment, when the coil connection states of the motor 7 are to be changed, V=0 because the voltage output from the inverter 30 is zero.

In the case where the motor 7 is a permanent-magnet synchronous motor, the voltage equation thereof can be expressed by the following expression (1).

[Expression 1]

$$\begin{bmatrix} Vd \\ Vq \end{bmatrix} = \begin{bmatrix} R & -\omega Lq \\ \omega Ld & R \end{bmatrix} \begin{bmatrix} id \\ iq \end{bmatrix} + \begin{bmatrix} 0 \\ \omega \varphi f \end{bmatrix} \quad (1)$$

where Vd is the d-axis voltage of the motor 7, Vq is the q-axis voltage of the motor 7, id is the d-axis current of the motor 7, iq is the q-axis current of the motor 7, ω is the electrical angular frequency, R is the winding resistance, Ld is the d-axis inductance of the motor 7, Lq is the q-axis inductance of the motor 7, and φf is the induced voltage constant.

When V=0, the switching elements 311, 312, and 313 of the lower arms of the inverter 30 are turned on, and the lines of the motor 7 are short-circuited; thus, Vd=Vq=0, and Id and Iq can be expressed by the following expression (2).

[Expression 2]

$$Id = \frac{\omega^2 \varphi_f Ld}{R^2 + \omega^2 * Lq^2}$$

$$Iq = \frac{\omega \varphi_f R}{R^2 + \omega^2 * Lq^2} \quad (2)$$

The torque of the motor 7 can be expressed by the following expression (3).

[Expression 3]

$$\tau_m = P_m \varphi_f I_q + P_m (L_d - L_q) I_d I_q \quad (3)$$

where $P_m$ is the number of pole pairs in the motor 7.

According to the above expressions (2) and (3), since the motor constants R, Ld, Lq, and φf are fixed values, the dq-axis current of the motor 7 varies in accordance with the rotational speed ω of the motor 7, and the torque $\tau_m$ of the motor 7 varies in accordance with the dq-axis current.

Here, the peak value of the dq-axis current can be expressed by the following expression (4).

[Expression 4]

$$I_p = \frac{\sqrt{2}}{\sqrt{3}} \frac{\omega^2 \varphi_f \sqrt{R^2 + \omega^2 L_d^2}}{R^2 + \omega^2 * Lq^2} \quad (4)$$

Figure 10:
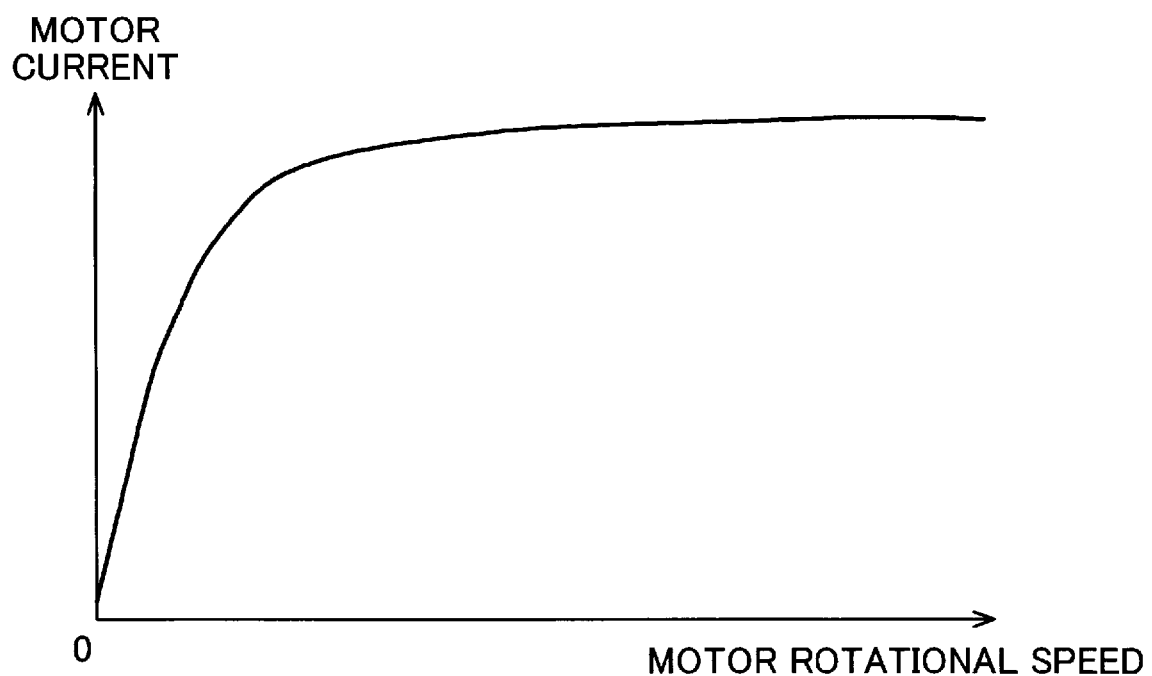
FIG. 10 is a graph with rotational speed of the motor on the horizontal axis and the peak value of motor current on the vertical axis.

FIG. 10 is a graph illustrating the locus of the expression (4), where the horizontal axis represents the rotational speed of the motor, and the vertical axis represents the peak value of the motor current.

As illustrated in FIG. 10, as the rotational speed of the motor 7 increases, the current value of the motor current during zero voltage output converges to a certain value.

Figure 11:
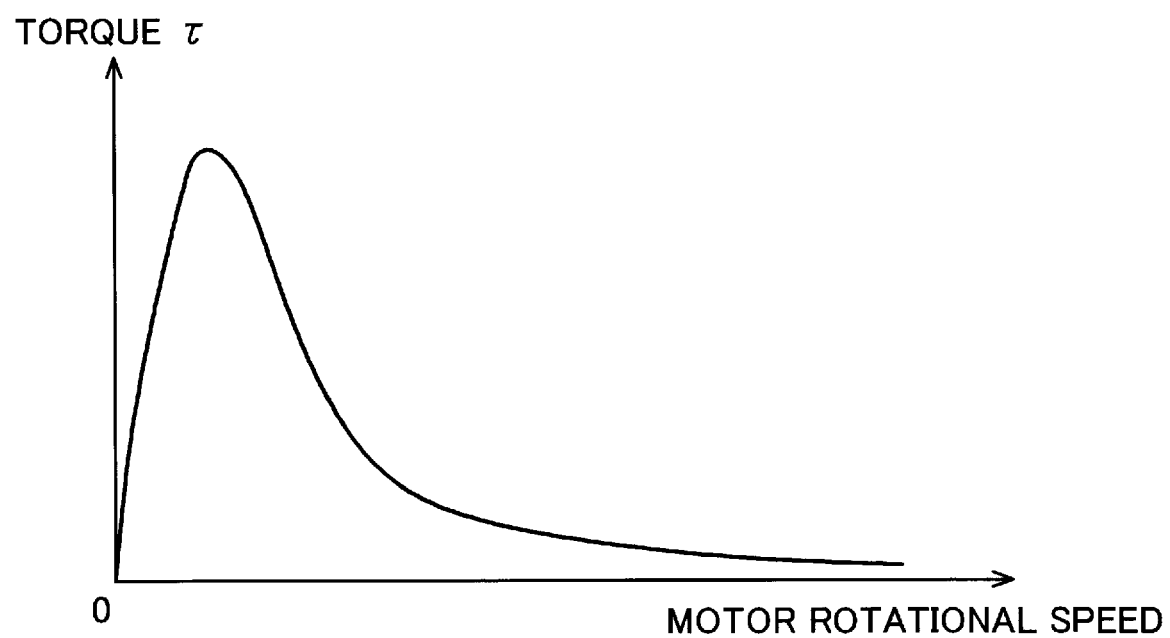
FIG. 11 is a graph with rotational speed of the motor on the horizontal axis and torque of the motor on the vertical axis.

FIG. 11 is a graph illustrating the locus of the expression (4), where the horizontal axis represents the rotational speed of the motor 7, and the vertical axis represents the torque of the motor 7.

As illustrated in FIG. 11, as the rotational speed of the motor 7 increases, the brake torque of the motor 7 during zero voltage output decreases.

The variation in the rotational speed of the motor 7 is represented by the following expression (5).

[Expression 5]

$$\Delta \omega = \frac{\tau_m - \tau_l}{J} \quad (5)$$

where Δω is the variation in the rotational speed of the motor, $\tau_m$ is the motor torque, $\tau_l$ is the load torque, and J is inertia.

During the zero-voltage control, the torque of the motor 7 is the brake torque $\tau_b$, and thus $\tau_m = -\tau_b$ as in the expression (5).

Therefore, the smaller the brake torque is, the smaller the variation in the rotational speed of the motor 7 is.

Consequently, if the rotational speed of the motor 7 is sufficiently raised, the brake torque decreases; therefore, even when the output voltage of the inverter 30 is zero to change the coil connection states of the motor 7, the rotational speed of the motor 7 does not readily decrease, and the influence accompanying the changeover of the coil connection states can be minimized.

Figure 12:
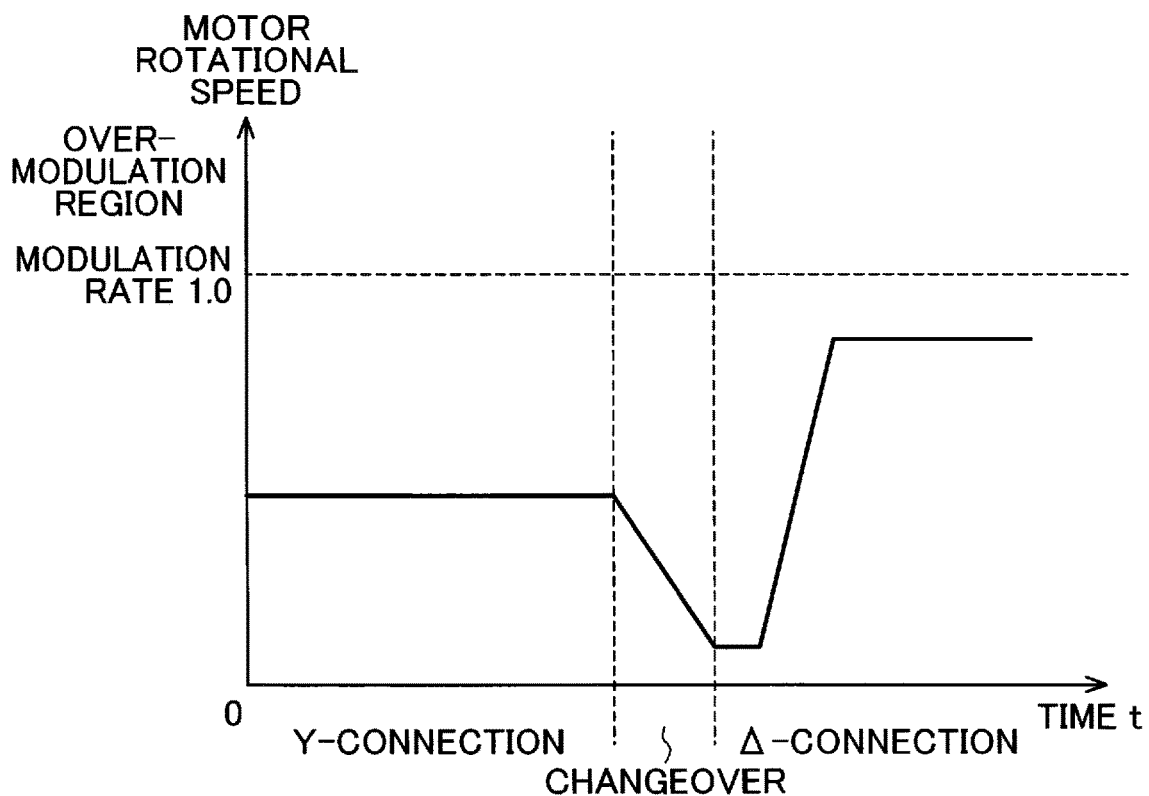
FIG. 12 is a first graph with time on the horizontal axis and rotational speed of the motor on the vertical axis.

Specifically, when the coil connection states are changed by setting the output voltage of the inverter 30 to zero without raising the rotational speed of the motor 7 to the overmodulation region, the brake torque of the regenerative braking of the inverter 30 becomes large; this causes a significant decrease in the rotational speed of the motor 7, as illustrated in FIG. 12.

Figure 13:
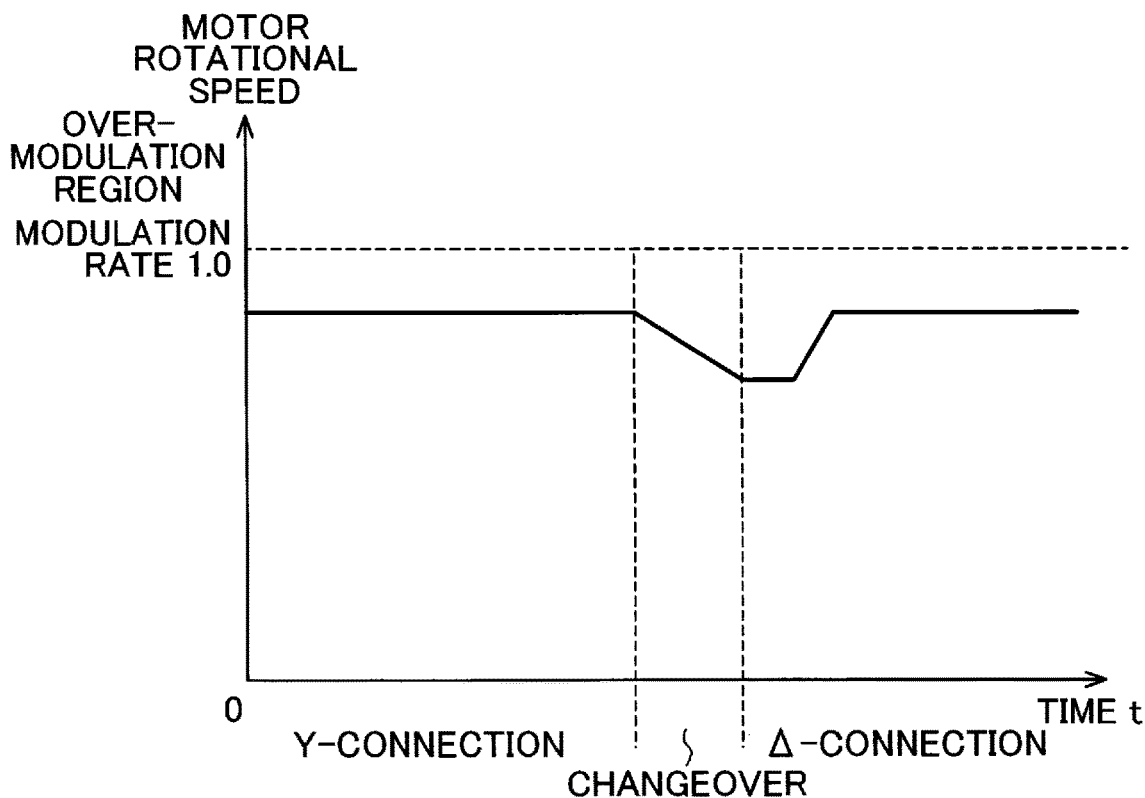
FIG. 13 is a second graph with time on the horizontal axis and rotational speed of the motor on the vertical axis.

As disclosed in Japanese Patent Application Publication No. 2013-62888 in the background art, when the coil connection states are to be changed while the output current is zero, the output current cannot be zero if the voltage output from the inverter is increased to the overmodulation region. If the output current is zero, the output torque of the motor is also zero, and the load torque causes the rotational speed of the motor to decrease. Therefore, for example, the rotational speed of the motor significantly decreases, as illustrated in FIG. 13.

Figure 14:
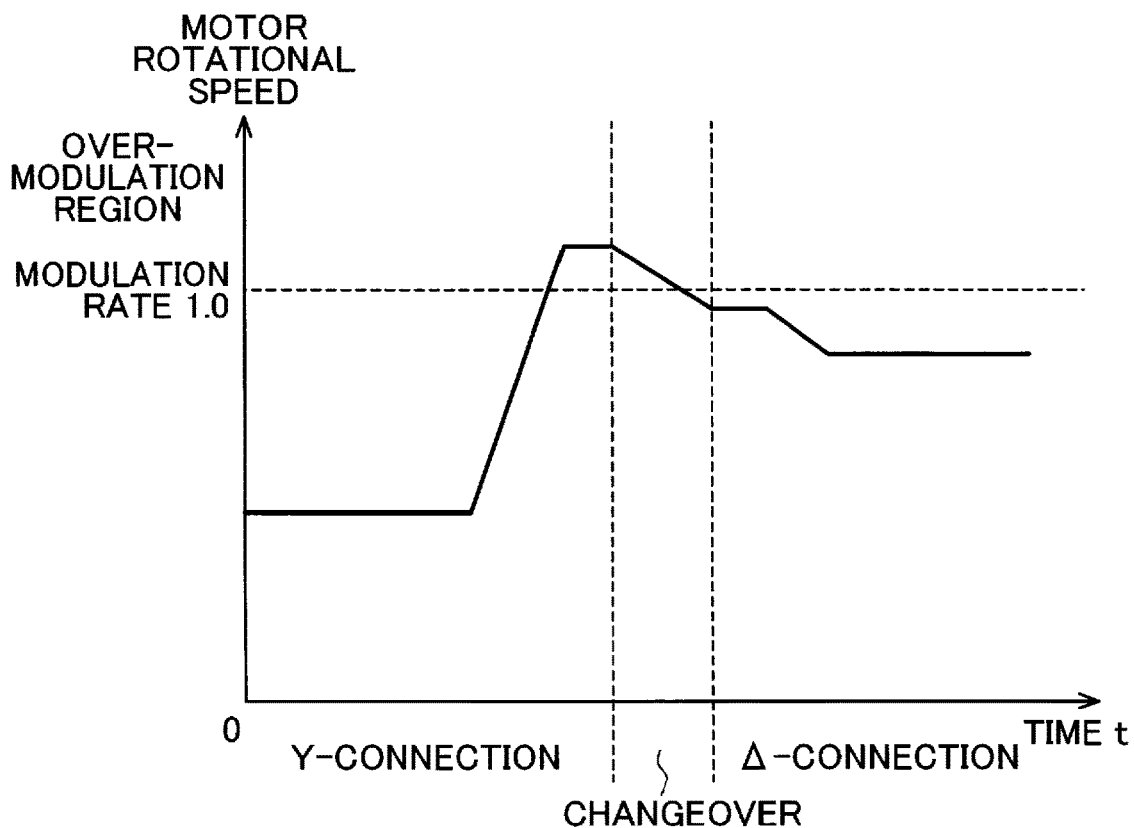
FIG. 14 is a third graph with time on the horizontal axis and rotational speed of the motor on the vertical axis.

In contrast, when the coil connection states are changed after the rotational speed of the motor 7 is raised to the overmodulation region as in this embodiment, the resistance component of the regenerative braking of the inverter 30 becomes small, and the rotational speed of the motor 7 does not decrease much, as illustrated in FIG. 14.

That is, in this embodiment, since the output voltage of the inverter 30 is zero, the voltage can be controlled to zero regardless of the output voltage, i.e., the voltage modulation rate of the inverter 30. Therefore, the coil connection states of the motor 7 can be changed while avoiding a drop in the rotational speed of the motor 7 in the overmodulation region, which enables a higher rotational speed, without stopping the motor 7.

Therefore, in this embodiment, the coil connection states of the motor can be changed without stopping the motor even with a motor having an overmodulation region of lower rotational speed or a motor having large load torque that causes the rotational speed to fall near zero during the changeover operation.

Figure 15:
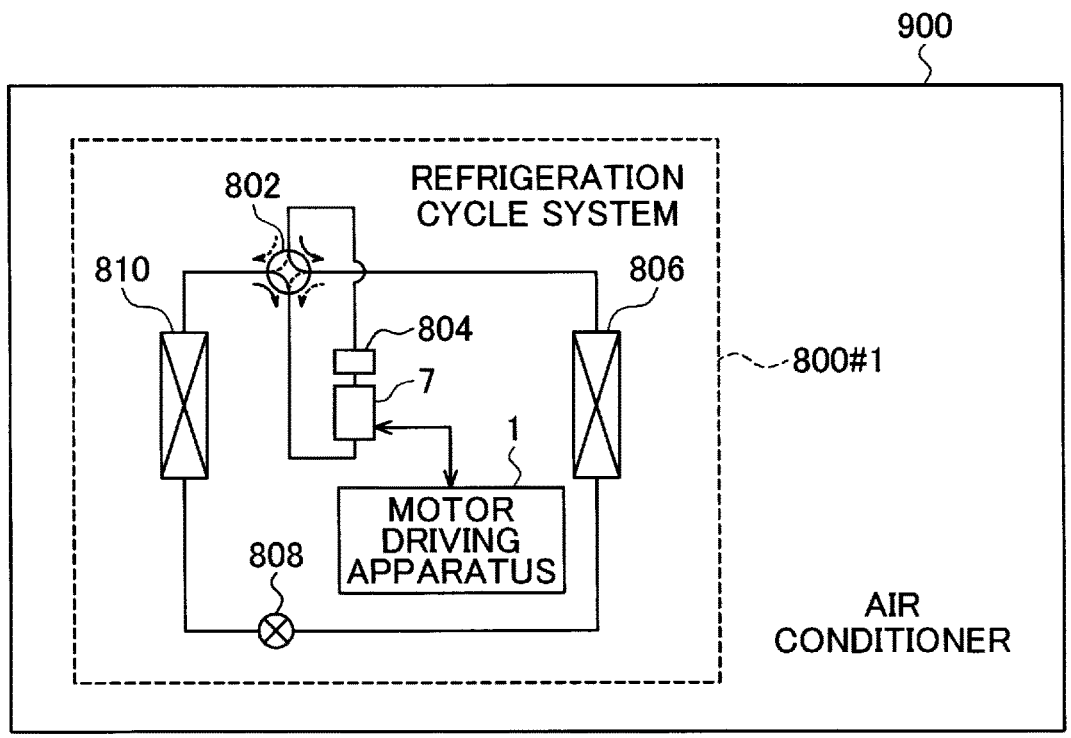
FIG. 15 is a schematic diagram illustrating a configuration example of an air conditioner.

FIG. 15 is a schematic diagram illustrating a configuration example of an air conditioner 900 including a refrigeration cycle system 800 #1 including a motor driving apparatus 1 according to an embodiment.

The refrigeration cycle system 800 #1 can perform heating operation or cooling operation through changing operation of a four-way valve 802.

During the heating operation, as indicated by the solid arrows, a refrigerant pressurized and discharged by a compressor 804 flows through the four-way valve 802, an indoor heat exchanger 806, an expansion valve 808, an outdoor heat exchanger 810, and the four-way valve 802, and returns to the compressor 804.

During the cooling operation, as indicated by the dashed arrows, the refrigerant pressurized and discharged by the compressor 804 flows through the four-way valve 802, the outdoor heat exchanger 810, the expansion valve 808, the indoor heat exchanger 806, and the four-way valve 802, and returns to the compressor 804.

During the heating operation, the heat exchanger 806 acts as a condenser and releases heat to heat the room, and the heat exchanger 810 acts as an evaporator and absorbs heat.

During the cooling operation, the heat exchanger 810 acts as a condenser and releases heat, and the heat exchanger 806 acts as an evaporator and absorbs heat to cool the room. The expansion valve 808 depressurizes and expands the refrigerant. The compressor 804 is driven by the motor 7 under variable speed control by the motor driving apparatus 1.

Figure 16:
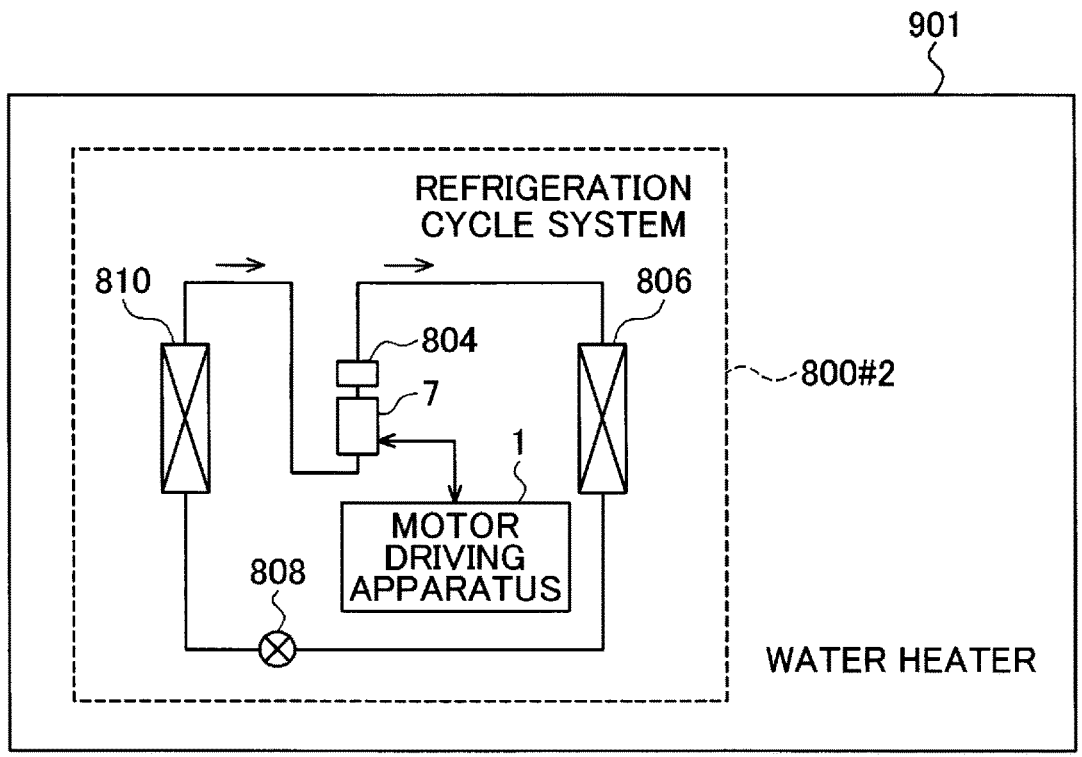
FIG. 16 is a schematic diagram illustrating a configuration example of a heat-pump type water heater.

FIG. 16 is a schematic diagram illustrating a configuration example of a heat-pump type water heater 901 including a refrigeration cycle system 800 #2 including the motor driving apparatus 1 according to an embodiment.

As illustrated in FIG. 16, in the refrigeration cycle system 800 #2, the heat exchanger 806 acts as a condenser and releases heat to heat water, and the heat exchanger 810 acts as an evaporator and absorbs heat. The compressor 804 is driven by the motor 7 under variable speed control by the motor driving apparatus 1.

Figure 17:
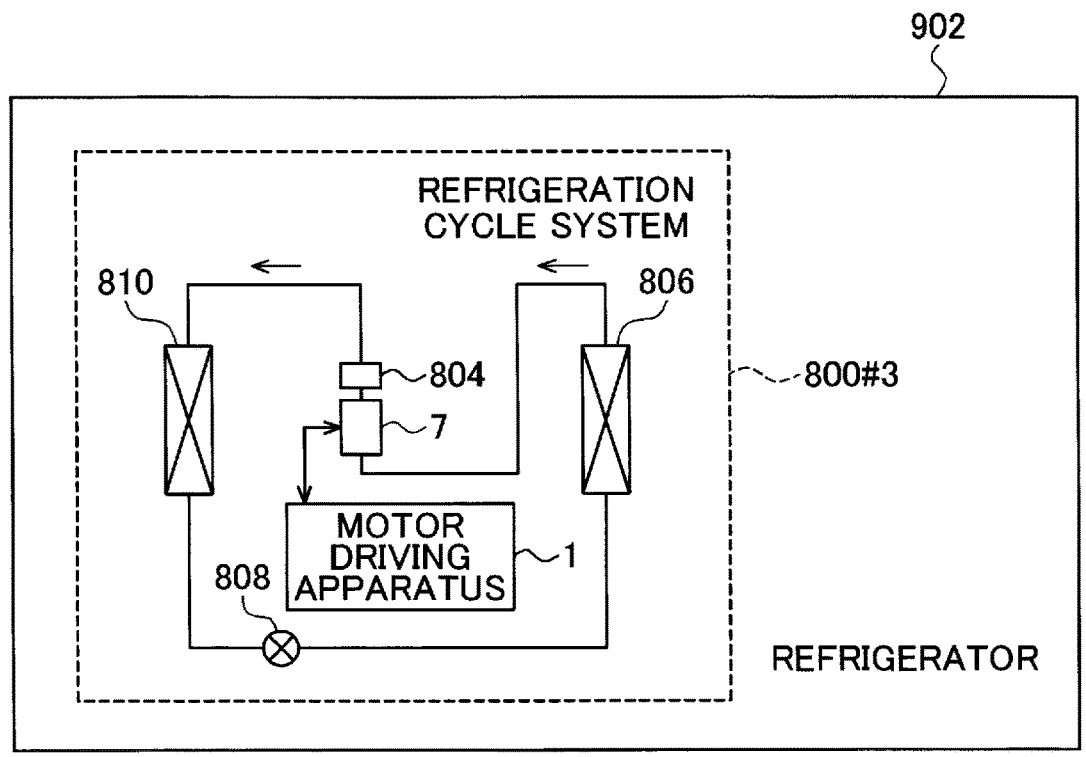
FIG. 17 is a schematic diagram illustrating a configuration example of a refrigerator.

FIG. 17 is a schematic diagram illustrating a configuration example of a refrigerator 902 including a refrigeration cycle system 800 #3 including the motor driving apparatus 1 according to an embodiment.

As illustrated in FIG. 17, in the refrigeration cycle system 800 #3, the heat exchanger 810 acts as a condenser and releases heat, and the heat exchanger 806 acts as an evaporator and absorbs heat to cool the inside of the refrigerator. The compressor 804 is driven by the motor 7 under variable speed control by the motor driving apparatus 1.

According to an embodiment described above, since the connection changeover device 60 including mechanical switches causes the coil connection states to change while the alternating voltage output from the inverter 30 is zero, the potential difference generated between the contacts of the switches is suppressed, and contact sticking caused by arcs generated by the potential difference can be suppressed. Therefore, the coil connection states can be changed while enhancing the reliability of the switches.

By turning off the switching elements 311, 312, and 313 of the upper arms of the inverter 30, the alternating voltage output from the inverter 30 can be readily set to zero.

While the switching elements 311, 312, and 313 of the upper arms of the inverter 30 are turned off, the changeover preparation operation is performed to alternately turn on and off the switching elements 314, 315, and 316 of the lower arms; subsequently, the switching elements 314, 315, and 316 of the lower arms are turned on, and the connection changeover device 60 causes the coil connection states to change; in this way, inrush current that occurs when the switching elements 314, 315, and 316 of the lower arms are turned on can be suppressed, and current larger than or equal to the demagnetization current can be prevented from flowing to the motor 7. In this way, demagnetization of the motor 7 can be suppressed.

Note that, the periods during which the switching elements 314, 315, and 316 of the lower arms are turned on become longer over time during the changeover preparation operation; in this way, the effect of suppressing the inrush current occurring when the switching elements 314, 315, and 316 of the lower arms are turned on can be enhanced.

By raising the rotational speed of the motor 7 to the overmodulation region and then setting the alternating voltage output from the inverter 30 to zero, the regenerative braking torque is reduced, and a drop in the rotational speed of the motor 7 when the coil connection states are changed can be suppressed.

What is claimed is:

1. A motor driving apparatus comprising:
   a mechanical switch to change coil connection states of a motor;
   an inverter to generate alternating voltage from direct voltage and to output the alternating voltage to the motor; and
   a control device to control the mechanical switch and the inverter; wherein
   the inverter includes a switching element of an upper arm positioned on a high potential side of the direct voltage, and a switching element of a lower arm positioned on a low potential side of the direct voltage; and
   after the control device performs changeover preparation operation of alternately turning on and off the switching element of the lower arm while the control device turns off the switching element of the upper arm to cause the alternating voltage output from the inverter to be zero, the control device turns on the switching element of the lower arm and causes the mechanical switch to change the coil connection states.

2. The motor driving apparatus according to claim 1, wherein, in the changeover preparation operation, the control device causes periods in which the switching element of the lower arm is turned on to become longer over time.

3. The motor driving apparatus according to claim 1, wherein the mechanical switch is an electromagnetic contactor.

4. A refrigeration cycle system comprising:
a motor; and
the motor driving apparatus according to claim 1.

5. An air conditioner comprising:
the refrigeration cycle system according to claim 4.

6. A water heater comprising:
the refrigeration cycle system according to claim 4.

7. A refrigerator comprising:
the refrigeration cycle system according to claim 4.

8. A motor driving apparatus comprising:
a mechanical switch to change coil connection states of a motor;
an inverter to generate alternating voltage from direct voltage and to output the alternating voltage to the motor; and
a control device to control the mechanical switch and the inverter;
wherein the control device causes the mechanical switch to change the coil connection states while the alternating voltage output from the inverter is zero after increasing the rotational speed of the motor to an overmodulation region.

9. The motor driving apparatus according to claim 8, wherein the mechanical switch is an electromagnetic contactor.

10. A refrigeration cycle system comprising:
a motor; and
the motor driving apparatus according to claim 8.

11. An air conditioner comprising:
the refrigeration cycle system according to claim 10.

12. A water heater comprising:
the refrigeration cycle system according to claim 10.

13. A refrigerator comprising:
the refrigeration cycle system according to claim 10.

* * * * *